US010364856B2

(12) United States Patent
Lindsly et al.

(10) Patent No.: US 10,364,856 B2
(45) Date of Patent: Jul. 30, 2019

(54) BRAKE SHIM WITH BUCKLE PREVENTION

(71) Applicants: Zack Lindsly, Shelton, CT (US); Tom Reynolds, Shelton, CT (US)

(72) Inventors: Zack Lindsly, Shelton, CT (US); Tom Reynolds, Shelton, CT (US)

(73) Assignee: Preferred Tool & Die, Inc., Shelton, CT (US)

( * ) Notice: Subject to any disclaimer, the term of this patent is extended or adjusted under 35 U.S.C. 154(b) by 0 days.

(21) Appl. No.: 15/917,060

(22) Filed: Mar. 9, 2018

(65) Prior Publication Data

US 2018/0259017 A1 Sep. 13, 2018

Related U.S. Application Data

(60) Provisional application No. 62/469,209, filed on Mar. 9, 2017.

(51) Int. Cl.
| | |
|---|---|
| *F16D 65/092* | (2006.01) |
| *F16D 65/097* | (2006.01) |
| *F16D 65/00* | (2006.01) |
| *F16L 27/12* | (2006.01) |

(52) U.S. Cl.
CPC ..... *F16D 65/0971* (2013.01); *F16D 65/0006* (2013.01); *F16L 27/12* (2013.01)

(58) Field of Classification Search
CPC .............. F16D 65/02; F16D 65/092; F16D 2200/0008; F16D 2200/0056; F16D 2200/0078

USPC ............ 188/73.1, 73.2, 73.31–73.39, 188/73.41–73.47, 250 B, 250 C, 250 D, 188/250 E, 250 F, 250 G, 251 A, 251 M, 188/250 R

See application file for complete search history.

(56) References Cited

U.S. PATENT DOCUMENTS

| | | | |
|---|---|---|---|
| 4,603,760 A | | 8/1986 | Myers |
| 5,427,213 A | * | 6/1995 | Weiler ............. F16D 65/0006 188/250 B |
| 6,213,257 B1 | * | 4/2001 | Yano ............... F16D 65/0006 188/250 E |
| 6,913,120 B2 | * | 7/2005 | Bosco .............. F16D 65/092 188/250 E |
| 2016/0245350 A1 | | 8/2016 | Hoxie et al. |

FOREIGN PATENT DOCUMENTS

DE 102014014574 A1 3/2016

* cited by examiner

*Primary Examiner* — Christopher P Schwartz
(74) *Attorney, Agent, or Firm* — St. Onge Steward Johnston & Reens, LLC

(57) ABSTRACT

A brake shim including a flat body with a lug hole, an expansion feature adjacent to and partially circumscribing the lug hole, the expansion feature being an elongated hole having a curved inner edge adjacent to the lug hole and a curved outer edge opposite the curved inner edge, and a bridge portion of the body between the lug hole and the curved inner edge that is flexible in a direction of curved outer edge.

20 Claims, 4 Drawing Sheets

BRAKE SHIM WITH BUCKLE PREVENTION

FIELD OF THE INVENTION

The invention relates to disc brakes, and more specifically to a brake shim for use in disc brakes with a buckle prevention feature.

BACKGROUND OF THE INVENTION

Disc brakes have been commonplace in automobiles for decades. Most modern cars have disc brakes on the front wheels, and often on all four wheels. Disc brakes generally include a rotor or disc connected to the wheel and/or axle, and a pair of brake pads on either side of the rotor that are squeezed inwardly against the rotor by means of a caliper. The caliper may be actuated, for example, hydraulically or pneumatically.

Brake pads generally include a metal backing plate with friction material fixed on one side to contact the rotor. Brake pads also typically have a shim, or noise insulator, on the opposite side of the backing plate from the friction material. Brake shims are thin metal, composite, rubber and/or adhesive pads that fit between the brake pad and the brake caliper to correct for differences that may lead to noise or rattling.

A brake shim may be attached to a backing plate by clip-on tabs that attach around edges of the back plate, by adhesive layer on the face of the shim, by riveting, or combinations thereof. Riveting is a common way to attach shims, particularly in shims for which tabs are impractical or undesired. An orbital riveting process is typically used in which distal ends of lugs, extending from the backing plate and through holes in the shim, are riveted and spread apart to secure the shim. However, one problem with this type of attachment is that the shim has a tendency to buckle or otherwise not lay flat if the holes do not correctly align with lugs, or if the lug swells during the riveting process.

SUMMARY OF THE INVENTION

Accordingly, it is an object of the present invention to provide an improvement to shims and the means of attachment to backing plates in order to overcome the problems in the prior art.

These and other objectives are achieved by providing a brake shim or noise insulator, including a flat body with at least one lug hole, an expansion feature adjacent to and partially circumscribing the lug hole, the expansion feature being an elongated hole having a curved inner edge adjacent to the lug hole and a curved outer edge opposite the curved inner edge, and a bridge portion of the body between the lug hole and the curved inner edge that is flexible in a direction of curved outer edge.

A width of the bridge portion between the curved inner edge and the lug hole may be reduced at a middle portion of the expansion feature. In some embodiments, the feature includes at least one indent extending towards the lug hole. The width of the bridge portion may be smallest in a middle portion of the expansion feature and increases towards top and bottom portions of the expansion feature. The shim material between the feature and the lug hole is adapted to flex back and forth as necessary to accommodate variations or fluctuations in lug position and size. In some embodiments, the expansion feature enables the diameter of the lug hole to be expandable by at least 30% in a widthwise direction.

The expansion feature may have a length greater than a diameter of the lug hole. For example, the length of the expansion feature is at least 25% greater than the diameter of the lug hole, or at least 40% greater than the diameter of the lug hole.

Further provided is a brake pad for a vehicle, including a backing plate, a friction element attached to a first side of the backing plate, two lugs extending from a second side of the backing plate, and a shim. The shim includes a body portion having two holes each receiving one of the two lugs, an expansion feature adjacent to one of the two holes, the expansion feature being an elongated hole having a curved inner edge adjacent to the one of the two holes and a curved outer edge opposite the curved inner edge, and a bridge portion between the one of the two holes and the curved inner edge that is flexible in a direction of curved outer edge, wherein the two lugs are riveted securing the shim to the backing plate.

Other objects of the invention and its particular features and advantages will become more apparent from consideration of the following drawings and accompanying detailed description.

DETAILED DESCRIPTION OF THE INVENTION

Figure 1:
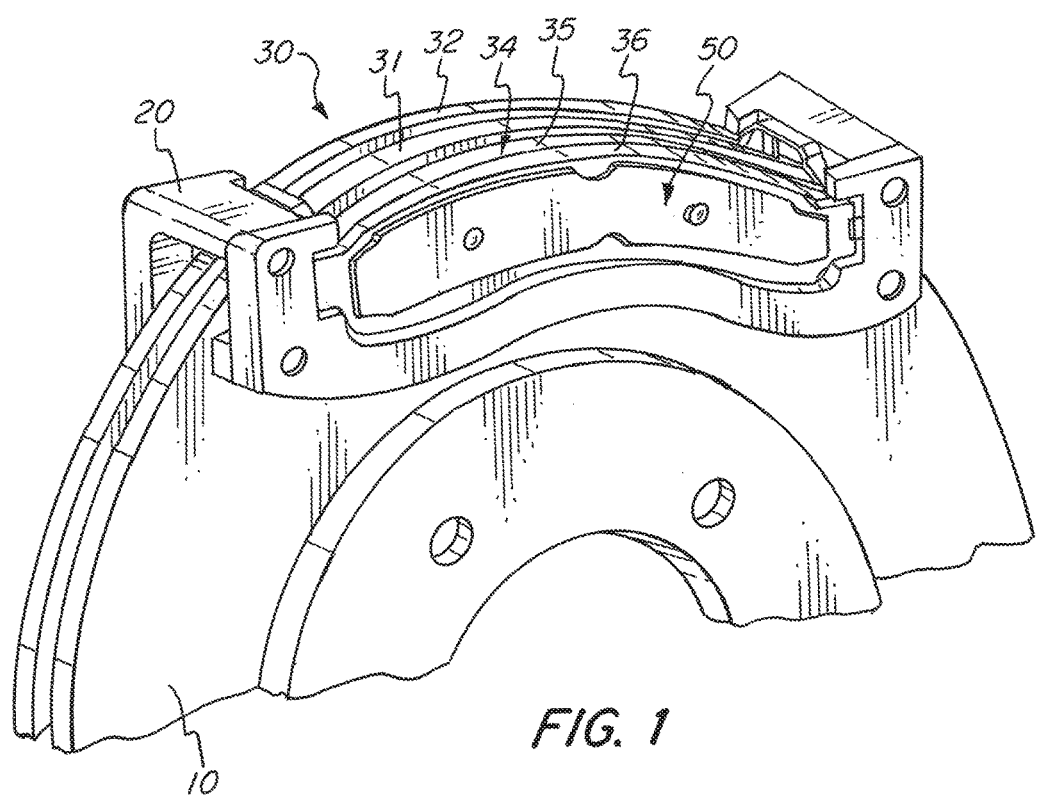
FIG. 1 is a disc brake including brakes pads with shims according to an exemplary embodiment of the present invention.

FIG. 1 illustrates a disk brake system for a vehicle, such as a passenger car. The system includes a rotor 10 and a caliper 20. Within the caliper 20, there are two brake pads 30,34 disposed on opposite sides of the rotor 10. An actuator acts to put the brake pads 30,34 in contact with the rotor 10 upon braking being applied by a driver of the vehicle. Each brake pad 30,34 comprises a backing plate 32,36 with friction material 31,35 attached to an inboard or front surface of the backing plate. The friction material 31,35 is adjacent to the rotor 10 to provide friction against the rotor 10 during actuation.

An outboard or back surface of the backing plate 32,36 of each of the brake pads 30,34 includes a shim 50. The shim 50 provides insulation from noise and vibrations. In the exemplary embodiment, the shim 50 is attached to the backing plate 32,36 by orbital riveting of two or more lugs extending from the back surface of the backing plate 32,36 through corresponding lug holes in the shim 50.

Figure 2:
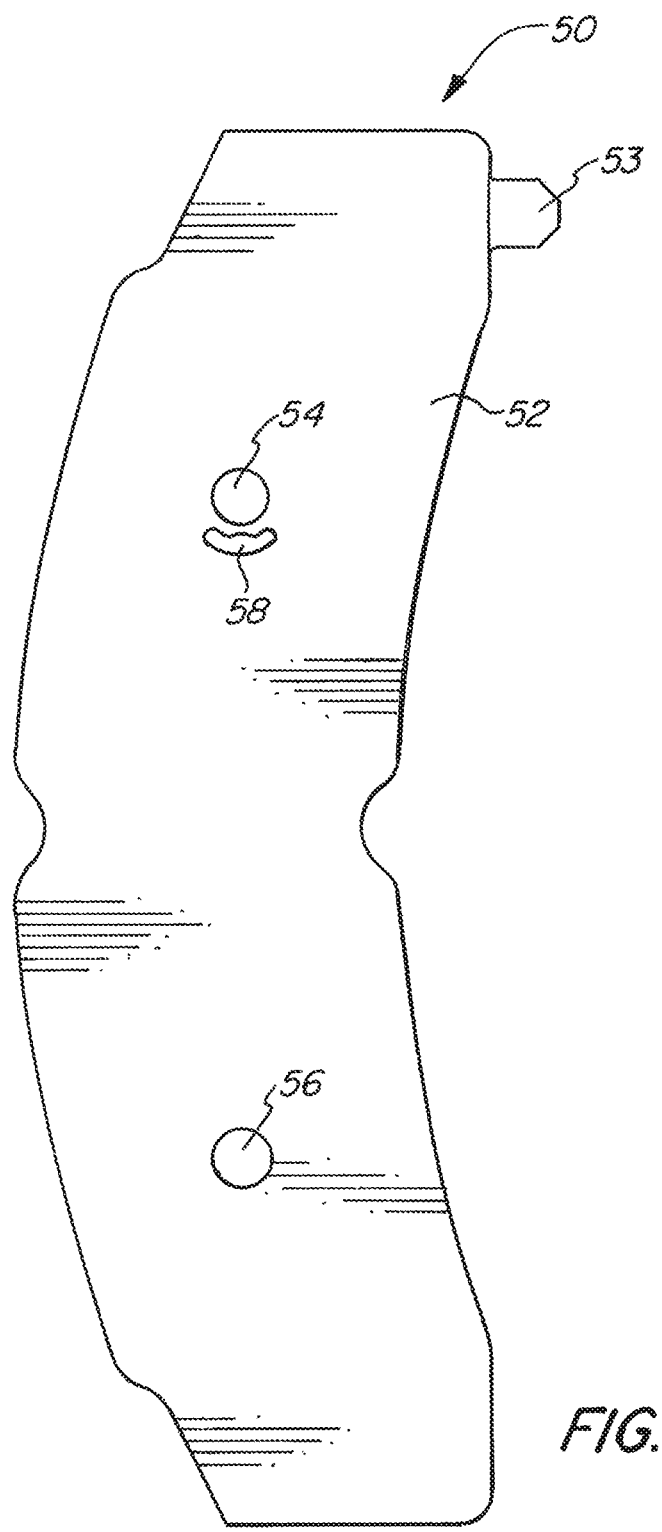
FIG. 2 is a shim of the disk brake according to an exemplary embodiment of the present invention.

FIG. 2 illustrates a shim 50 according to an exemplary embodiment of the present invention. The shim 50 includes a generally flat body portion 52. The body portion 52 may be comprised of a composite material, e.g., including metal and rubber. In some embodiments, the body portion 52 is comprised of multiple layers including metal (e.g., steel), rubber, and/or adhesive. In the exemplary embodiment, one entire side of the shim 50 includes an adhesive layer covered by a removable liner. The liner is removable by means of a pull tab 53. Upon removal, the shim 50 is adhered to the backing plate 36 of the brake pad 34 using the adhesive.

The body portion 52 of the shim 50 includes a plurality of lug holes for receiving lugs extending from the back surface of the backing plate 32,36 of the brake pad 30,34. In the exemplary embodiment, the shim 50 includes a hole 54 on one side and a hole 56 on the opposite side. In other embodiments, there are two or more holes on each of the opposite sides.

At least one of the holes 54,56 has an expansion or anti-buckling feature 58 that allows the shim body 52 to adjust and flatten out against the back surface of the backing plate 32,36. In the exemplary embodiment, the feature 58 is an elongated cutout (e.g., punched hole) partially circumscribing the corresponding hole 54. The feature 58 may be placed on an inboard side of one of the holes 54 (i.e., in a direction of the other opposite lug) as in the present embodiment. However, the feature 58 may also be on an outboard side, or on both inboard and outboard sides of the hole 54. In one exemplary embodiment, there is a feature 58 on the outboard side of one hole (e.g., hole 56) and the inboard side of the other hole (e.g., hole 54).

Figure 3:
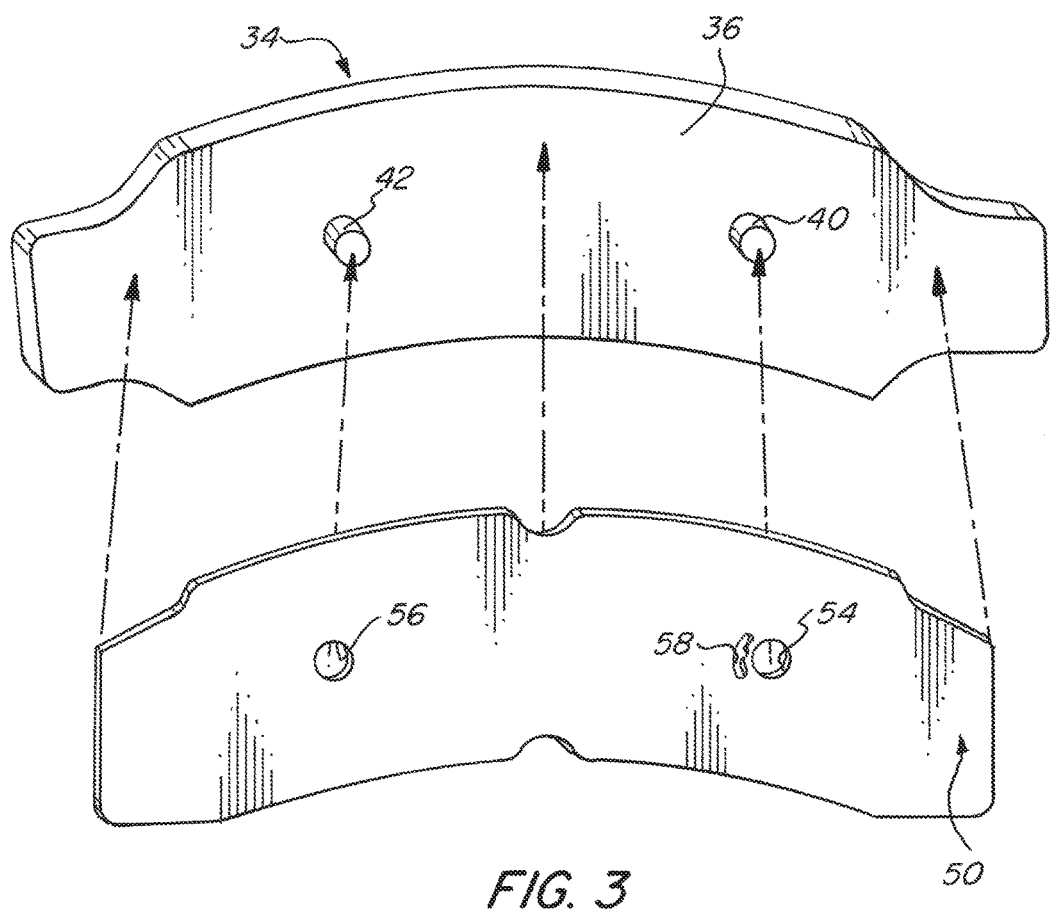
FIG. 3 illustrates assembly of a brake pad with a shim according to an exemplary embodiment of the present invention.

FIG. 3 illustrates the assembly of a brake pad with a shim. The back surface of the backing plate 36 of the brake pad 34 includes two or more lugs 40,42. The shim 50 is installed over two lugs 40,42 (e.g., after removal of the liner). The shim 50 is then riveted onto the backing plate 36. For example, the lugs 40,42 may be orbital riveted to secure the shim 50 to the backing plate 36.

As one skilled in the art will understand, sometimes the lugs 40,42 do not perfectly align with the lug holes 54,56 due to variations among different backing plate manufacturers and/or manufacturing tolerances. When this occurs with prior art shims, it may be difficult to fit the holes 54,56 over the lugs 40,42. The shim 50 may buckle, such that does not rest flat on the backing plate, due to stresses against the holes 54,56 when the lugs 40,42 do not align correctly. Even if the lugs 40,42 align perfectly with the holes 54,56 prior to assembly, the riveting process deforms or swells the lugs 40,42 and can cause buckling of the shim 50. The present invention solves this problem with its expansion feature 58.

Figure 4A:
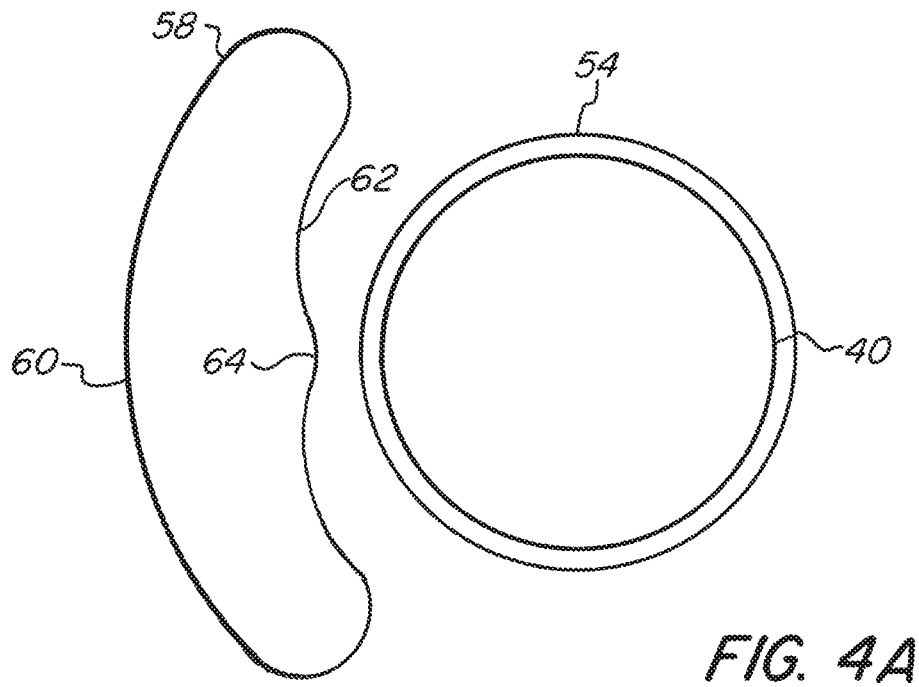
FIGS. 4A-4B show an expansion feature and hole portion of the shim of FIG. 2.

FIG. 4A illustrates the feature 58 in more detail adjacent to the hole 54 with a lug 40 extending therethrough. In the exemplary embodiment, the feature 58 is an elongated cutout or hole with an outer edge 60 and an inner edge 62 connected to one another by rounded corners. The feature 58 may be created, for example, with a punch tool during a stamping process.

The outer edge 60 is generally arc-shaped outward from the hole 54 with its top and bottom ends curving towards the hold 54. The inner edge 62 is also arc-shaped but preferably has a central or middle portion that extends closer to the hole 54 to create an area of reduced width between the feature 58 and the hole 54. In the exemplary embodiment, the inner edge 62 includes an indent 64 extending towards the hole 54. In other embodiments, the inner edge 62 may have different shapes such as a shape with two or more indents. The reduced width at the indent 64 facilitates flexing or bending of the material between the feature 58 and the hole 54 (i.e., the bridge portion) outward.

The feature 58 preferably has a length (top to bottom) equal to or greater than a diameter of the adjacent hole (e.g., hole 54). For example, the length of the feature 58 may be at least 25% greater than the diameter of the hole 54 in some embodiments, and at least 40% greater in other embodiments. In the exemplary embodiment, the holes 54,56 have a diameter of about 0.220 in., the lugs have a diameter of about 0.195 in., and the length of the feature (top to bottom) is about 0.310 in. The width of the feature 58 is generally less than the radius of the adjacent hole 54. In the exemplary embodiment, the width of the feature 58 is about 0.088 in, in the widest part (middle portion) and about 0.068 in. elsewhere (top and bottom). The material between the feature 58 and the hole 54, referred to herein as the bridge or bridge portion, has a reduced width in the area of the indent(s) 64. The width of the bridge between hole 54 and the widest part of feature 58 is about 0.030 in. the exemplary embodiment.

When the lugs 40 and holes 54 are sufficiently aligned, the lug 40 extends through the center of the hole 54 as shown in FIG. 4A. However, the lugs 40 may not precisely align with the holes 54,56. This may occur due to slight variations in backing plate designs and lug placements by different manufacturers. In particular, lug 40 on opposite sides of the backing plate may be slightly too close together on some backing plates, or too far apart. One or both of the opposing lugs 40 may also swell during orbital riveting and/or the backing plate may bend or expand/contract during use. If this occurs with a traditional shim, the shim generally buckles and no longer lays flat against the backing plate.

Figure 4B:
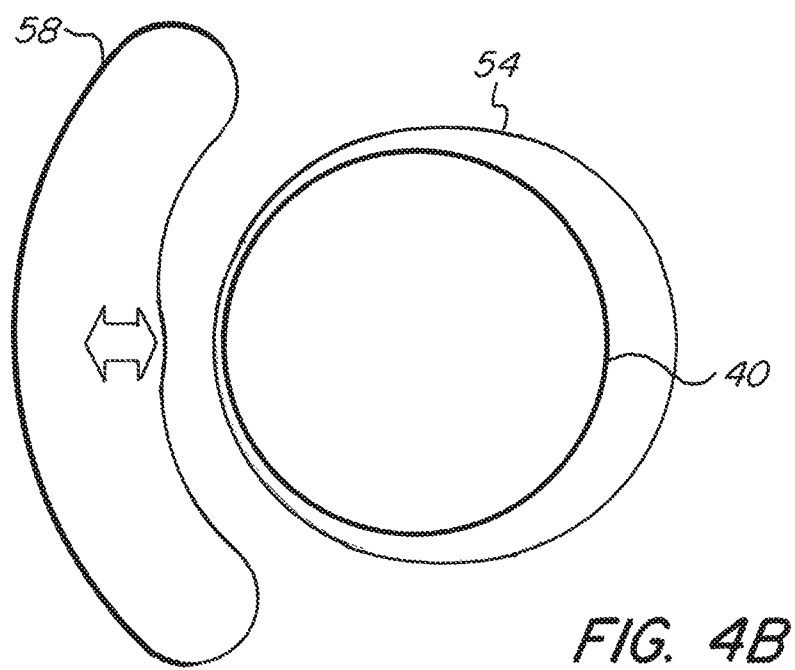

In the present invention, the hole 54 is able to adjust due to the unique feature 58. The bridge portion between the indent 64 and the hole 54 may flex or bend as necessary in either direction. For example, if the lug 40 is forced against the wall of the hole 54 adjacent to the feature 58 as shown in FIG. 4B, the bridge is able to flex outward (narrowing the width of the feature 58). Thus, the feature 58 absorbs the stress of the lug 40 against the edge of the hole 54 and allows the shim body 52 to remain flat against the backing plate between the lugs 40 without buckling.

The hole 54 may flex and take an oval shape to the extent of the width of the feature 58, depending on the material. In some embodiments, the diameter of the hole 54 may flex at least 30% in the widthwise direction, or at least 40%. For example, in the exemplary embodiment the width of the feature 58 in the middle portion is 0.088 in. Thus, an adjacent hole having a diameter of 0.220 in. may flex in a widthwise direction up to 0.308 in.

Although the invention has been described with reference to a particular arrangement of parts, features and the like, these are not intended to exhaust all possible arrangements or features, and indeed many modifications and variations will be ascertainable to those of skill in the art.

What is claimed is:

1. A brake shim, comprising:
   a flat body with a lug hole;
   an expansion feature adjacent to and partially circumscribing the lug hole;
   said expansion feature being an elongated hole extending from a first end adjacent to the lug hole to a second end adjacent to the lug hole and having a curved inner edge extending between the first and second ends adjacent to the lug hole and a curved outer edge extending between the first and second ends opposite the curved inner edge; and
   a bridge portion of said body between the lug hole and the curved inner edge that is flexible in a direction of the curved outer edge.

2. The brake shim according to claim 1, wherein the curved outer edge curves outward from the lug hole.

3. The brake shim according to claim 2, wherein, at a middle portion of said expansion feature, the curved inner edge curves inward toward the lug hole.

4. The brake shim according to claim 1, wherein a width of the bridge portion between the curved inner edge and the lug hole is reduced at a middle portion of the expansion feature.

5. The brake shim according to claim 1, wherein the bridge portion has a width between the curved inner edge and the lug hole, the width being smallest in a middle portion of the expansion feature and increasing towards top and bottom portions of the expansion feature.

6. The brake shim according to claim 1, wherein the lug hole has a circular shape, wherein the lug hole is expandable to an oval shape by flexing the bridge portion.

7. The brake shim according to claim 6, wherein a diameter of the lug hole is expandable by at least 30% in a widthwise direction.

8. The brake shim according to claim 1, wherein said expansion feature has a length greater than a diameter of the lug hole.

9. The brake shim according to claim 8, wherein the length of said expansion feature is at least 25% greater than the diameter of the lug hole.

10. The brake shim according to claim 8, wherein the length of said expansion feature is at least 40% greater than the diameter of the lug hole.

11. The brake shim according to claim 10, further comprising a backing plate having two lugs, a first one of the two lugs extending through the lug hole and a second one of the two lugs extending through the second lug hole.

12. The brake shim according to claim 1, wherein said flat body includes a second lug hole.

13. The brake shim according to claim 1, wherein said flat body of the shim is comprised of a plurality of layers including at least one metal layer and at least one rubber layer.

14. The brake shim according to claim 13, wherein the plurality of layers further includes an adhesive layer.

15. A brake pad for a vehicle, comprising:
a backing plate;
a friction element attached to a first side of the backing plate;
two lugs extending from a second side of the backing plate; and
a shim, including a body portion having two holes each receiving one of the two lugs, an expansion feature adjacent to one of the two holes, said expansion feature being an elongated hole extending from a first end adjacent to the one of the two holes to a second end adjacent to the one of the two holes and having a curved inner edge extending between the first and second ends adjacent to the one of the two holes and a curved outer edge extending between the first and second ends opposite the curved inner edge, and a bridge portion between the one of the two holes and the curved inner edge that is flexible in a direction of the curved outer edge;
wherein said two lugs are riveted securing said shim to said backing plate.

16. The brake pad according to claim 15, wherein said shim includes an adhesive layer between said shim and said backing plate.

17. The brake pad according to claim 15, wherein the bridge portion has a width between the curved inner edge and the lug hole, the width being smallest in a middle portion of the expansion feature and increasing towards top and bottom portions of the expansion feature.

18. The brake pad according to claim 15, wherein a diameter of the lug hole is expandable by at least 30% in a widthwise direction.

19. The brake pad according to claim 15, wherein said expansion feature has a length at least 25% greater than a diameter of the lug hole.

20. The brake pad according to claim 15, wherein said expansion feature has a length at least 40% greater than a diameter of the lug hole.

* * * * *